United States Patent
Hirst, Jr. et al.

[15] 3,693,472
[45] Sept. 26, 1972

[54] PARKING BRAKE OPERATING MEANS

[72] Inventors: Charles M. Hirst, Jr.; Eugene C. Lipshield, both of Moberly, Mo.

[73] Assignee: Orscheln Brake Lever Mfg. Company, Moberly, Mo.

[22] Filed: Dec. 28, 1970

[21] Appl. No.: 102,021

[52] U.S. Cl. ....................................74/518, 74/540
[51] Int. Cl. ..............................................G05g 1/04
[58] Field of Search........................74/518, 516, 540

[56] References Cited

UNITED STATES PATENTS

| | | | |
|---|---|---|---|
| 2,975,654 | 3/1961 | Vigmostad | 74/516 X |
| 3,194,085 | 7/1965 | Kirk | 74/540 |

*Primary Examiner*—William F. O'Dea
*Assistant Examiner*—F. D. Shoemaker
*Attorney*—Lawrence E. Laubscher

[57] ABSTRACT

Improved parking brake apparatus, including a pivotable cam member operable to initially effect fast take-up of the brake cable with relatively low mechanical advantage, and to subsequently effect slow take-up of the cable with relatively high mechanical advantage. The cam member is pivoted in the brake engaging direction by a foot-operated actuator member that is pivotally connected with the same housing as the cam member. The cam actuator member has a first arm portion that carries an actuating pin which engages a corresponding two-part cam surface on the cam member, and a second arm portion that carries one of pawl and ratchet locking components that releasably lock the actuator member in a brake engaged position.

6 Claims, 6 Drawing Figures

INVENTORS
Charles M. Hirst, Jr.
Eugene C. Lipshield
BY Lawrence E. Laubscher
ATTORNEY INVENTORS
Charles M. Hirst, Jr.
Eugene C. Lipshield
BY
Lawrence E. Laubscher
ATTORNEY

PARKING BRAKE OPERATING MEANS

As indicated by the prior U.S. Pat. Nos. 2,928,292, 3,379,074 and 3,487,716 that have issued in the name of the coinventor Charles M. Hirst, Jr., various types of brake cable operating means have been proposed in the patented prior art. While the known lever actuator means have generally performed most satisfactorily, it has proven to be most desirable from a functional standpoint in the automotive vehicle art to so effect operation of the parking brake cable that during initial operation of the brake means, the brake cable will have a relatively fast take-up, while during the final application of the parking brake, the cable will be tensioned with a relatively large braking force. It is a further criteria of the art that means be provided for positively locking the parking brake operating means in the brake engaged condition, and further that said locking means be readily releasable by the vehicle operator.

Accordingly, the primary object of the present invention is to provide parking brake operating means including cam means operable to initially effect fast take-up of the brake cable in the brake-engaging direction and for subsequently imparting with a great mechanical advantage a high brake tensioning force to the cable, in combination with readily releasable pawl and ratchet means for locking the operating means in the brake-engaged position.

A more specific object of the invention is to provide brake cable operating means including an actuator member that is pivotally connected with a rigid housing secured to the vehicle chassis for operation by a foot lever, said actuator including a pair of integral portions one of which carries pin means for actuating the aforementioned cam means and the other end of which carries the ratchet teeth of the pawl and ratchet locking means. Pawl release means are also connected with the housing to effect release of the locking pawl from the ratchet teeth, whereby the parking brake is released for return to the disengaged position.

A more specific object of the invention is to provide the cam means with a pair of angularly arranged cam surfaces that are successively engaged by the actuating pin during pivotal operation of the cam means in the brake engaging direction, the configuration of said cam surfaces being such as to initially effect relatively rapid initial take-up of the parking brake cable with a relatively low mechanical advantage, and to subsequently effect relatively slow take-up of the cable with a relatively high mechanical advantage.

Other objects and advantages of the invention will become apparent from a study of the following specification, when viewed in the light of the accompanying drawing, in which.

Figure 1:
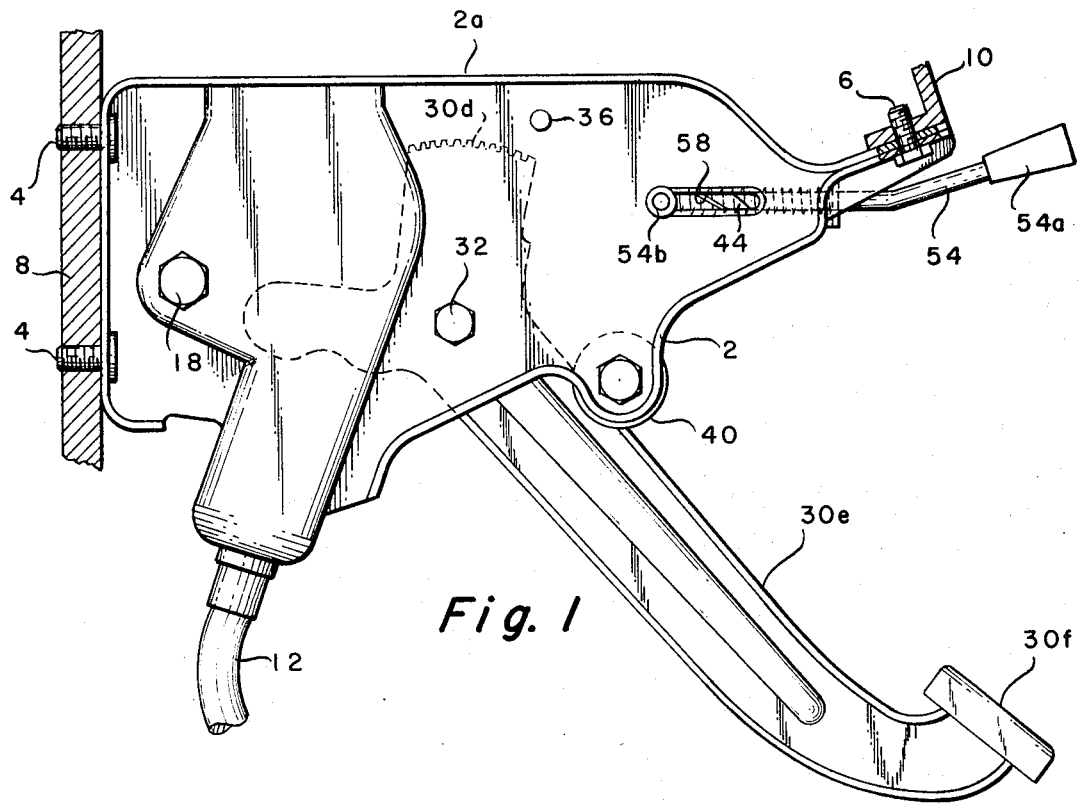
FIGS. 1 and 2 are left and right side elevation viewed, respectively, of the parking brake operating means of the present invention.
Figure 2:
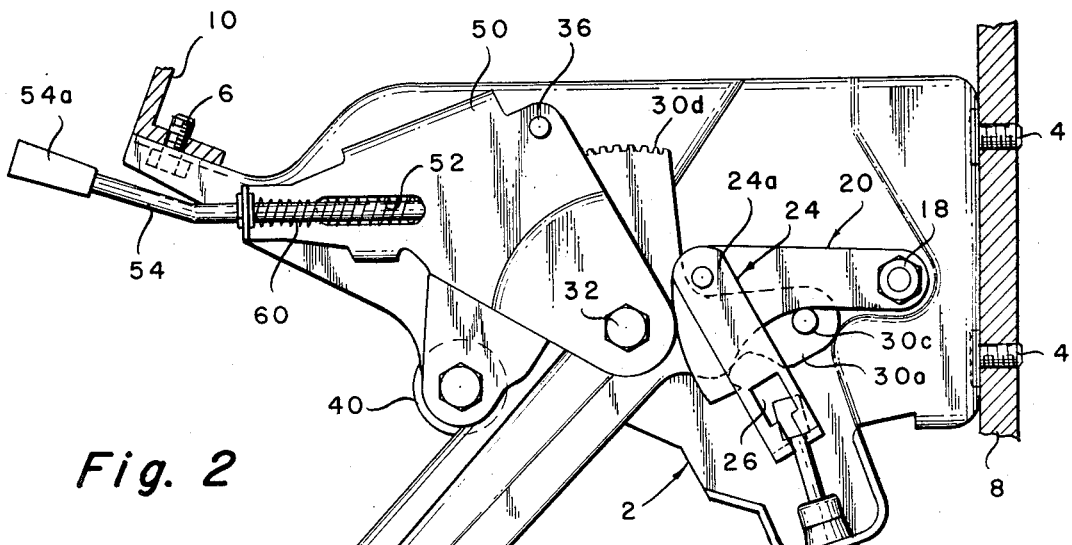

Referring now to the drawing, the improved parking brake operating means of the present invention includes a housing 2 formed of sheet metal and including a peripheral bent flange portion 2a the rearward and forward portions of which contain openings 3 for receiving bolts 4 and 6 by means of which the housing is rigidly secured to the firewall 8 and dash 10 of the vehicle chassis. Adjacent its lower edge the housing includes a bent horizontal flange portion 2b (FIGS. 2 and 5) that contains an opening for receiving the upper end of the conventional parking brake coaxial cable means 12. The outer cable sheath 13 is rigidly connected with the housing by the retaining clip means 14, and the inner cable member 16 is provided at its free extremity with an enlarged end portion 16a.

Figure 3:
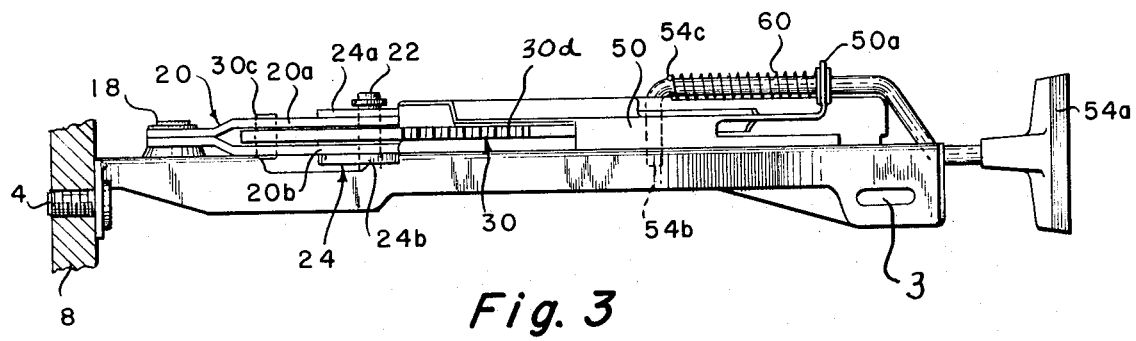
FIGS. 3 and 4 are top plan and rear elevation views, respectively, of the invention.

Pivotally connected at one end with the housing by pivot pin 18 is a bifurcated cam member 20 which includes two spaced parallel portions 20a and 20b as shown in FIG. 3. Pivotally connected at its upper end with the cam member 20 by pivot pin 22 is a U-shaped clevis member 24 the parallel leg portions 24a, 24b of which straddle the parallel portions 20a, 20b of the cam member 20. At its lower end, the clevis member includes a bridging portion 24c, the juncture between said bridging portion and said leg portion 24a containing a slot 26 (FIG. 2) that removably receives the enlarged upper end 16a of the cable 16. Consequently, when the cam member 20 is pivoted in the counterclockwise direction about pivot shaft 18 from the brake released position illustrated in FIG. 5 to the brake engaged position shown in phantom, pivot shaft 22' and clevis 24 are elevated to axially displace the cable 16 in the brake engaging direction relative to the sheath 13.

Figure 5:
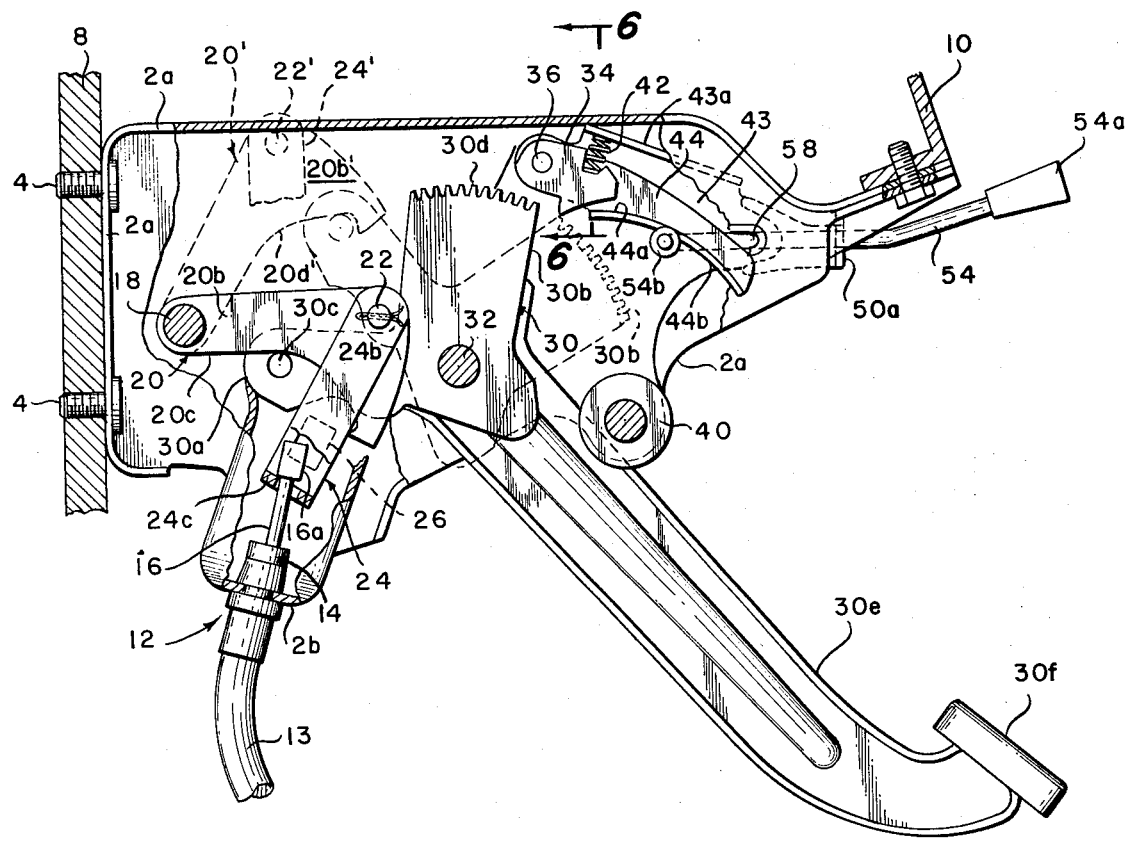
FIG. 5 is a partly broken away view of the apparatus corresponding to FIG. 1.
Figure 4:
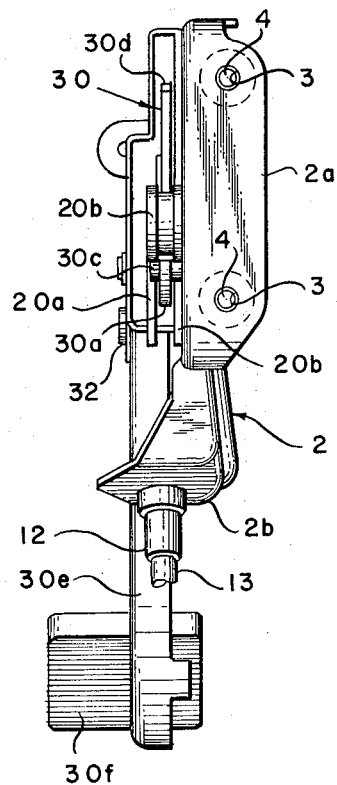

In order to pivot the cam member 20 from the brake released position toward the brake engaged position illustrated in phantom, cam operator means are provided including a generally L-shaped actuator member 30 that is pivotally connected with the housing by pivot pin 32, said actuator member including first and second arm portions 30a and 30b, respectively, that are contained between the parallel portions 20a and 20b of the cam means 20. Carried by the arm portion 30a of the actuator member 30 is a transverse actuator pin 30c that is arranged to operatively engage at each end the cam surfaces 20c and 20d formed on the lower edges of the portions 20a and 20b of the cam member 20. The free extremity of the other arm portion 30b of the actuator member is provided with ratchet teeth 30d that are adapted for engagement by a pawl 34 that is pivotally connected with the housing by pivot shaft 36. As shown in the drawing, all of the aforementioned pivot shafts and the actuator pin 30c are parallel. The actuator means further includes a foot-operated lever 30e that is rigidly connected at its upper end with the actuator member 30a, said lever carrying at its lower end the foot pad 30f. The extent of pivotal movement of lever 30e in the counterclockwise direction in FIG. 5 is limited by the cylindrical rubber bumber 40 that is secured to the lower portion of the housing 2.

Figure 6:
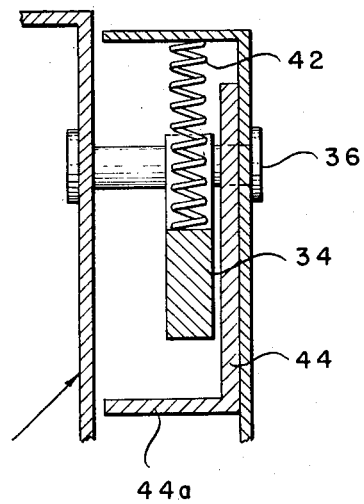
FIG. 6 is a sectional view taken along line 6—6 of FIG. 5.

Arranged between the pawl 34 and the flange portion 43a of a retaining plate 43 secured to the housing is a spring 42 that biases the pawl downwardly toward engagement with the ratchet teeth 30d. In order to pivot the pawl upwardly toward a released position relative to the ratchet teeth, there is provided a pawl release cam 44 that is pivoted at one end on the pivot shaft 36, the lower portion of the pawl release cam including an integral flange portion 44a that extends horizontally beneath the pawl (as shown in FIG. 6) and defines on its lower surface the cam surface 44b. Rigidly secured to the housing 2 about the pawl 34 and the pawl release cam 44 is a protective cover 50 that contains a horizontal slot 52 opposite said cam surface 44b on the pawl release cam. Guided for axial reciprocatory movement in an opening contained in the transverse forward wall portion 50a of the protective cover 50 is the brake release rod 54 having at one end the operating knob 54a, said rod including at its other end an orthogonally arranged transverse portion 54b that extends through the slot 52, beneath the cam surface 44b, and through a corresponding slot 58 contained in the housing 2. Return spring 60 (FIG. 3) mounted concentrically on rod 54 between flange 50a and the rod protuberance 54c biases the rod inwardly relative to the housing toward the position illustrated in FIG. 5.

In accordance with an important feature of the present invention, the cam surface provided at the lower edge of each of the portions 20a, 20b of the cam member 20 includes adjacent the pivot pin 18a first cam portion 20c that merges smoothly with an angularly arranged second cam portion 20d. The cam configuration is such relative to the location of the cam operating means 30 that during initial depression of the foot operated lever 30e in the brake engaging direction, pin 30c cooperates with cam surface 20c to effect upward pivotal movement of the cam member 20 in the counterclockwise direction, the cam member is initially pivoted at a relatively high angular velocity and with a relatively low mechanical advantage to initially effect a fast take-up of the brake cable 16 in the brake engaging direction. During final depression of the parking brake lever, the pin 30c cooperates with the second cam portion 20d to effect pivotal movement of the cam 20 at a relatively low angular velocity and a high mechanical advantage, whereby the brake cable is tensioned with a relative large force in the brake engaging direction.

OPERATION

Assume that the parking brake operating means is initially in the released position illustrated in FIG. 5.

To engage the parking brake, foot lever 30e is initially depressed to pivot actuator member 30 in the clockwise direction, whereby pin 30c cooperates with cam surface 20c to pivot cam member 20 upwardly (i.e., in the counterclockwise direction in FIG. 5) at a relatively high angular velocity and a relatively low mechanical advantage. Clevis 24 is elevated correspondingly to axially displace brake cable 16 at a relatively high take-up velocity in the brake-engaging direction. During this initial movement of the foot lever, the pawl 34 engages ratchet teeth 30d to prevent return movement of the actuator member 30 in the counterclockwise direction.

During the final depression of the parking brake lever 30e, the pin 30c engages cam portion 20d to effect further movement of the cam means in the counterclockwise direction at a relatively low angular velocity and with a relatively high mechanical advantage, whereby the brake cable 16 is tensioned with an appreciable force in the brake engaging direction. Return movement of the actuator member 30 in the counterclockwise brake-releasing direction is prevented by the cooperation between pawl 34 and ratchet teeth 30d. The parking brake is now in the fully-engaged locked condition.

To release the parking brake means, release rod 54 is pulled outwardly (i.e., to the right in FIG. 5) against the restoring force of return spring 60, whereby transverse rod portion 54b engages the lowermost cam surface 44b to pivot cam release member 44 upwardly in the counterclockwise direction about pin 36, whereby pawl 34 is pivoted upwardly against the restoring force of spring 42 to a released position relative to the ratchet teeth 30d. Owing to the brake tension force applied to cable 16 in the brake releasing direction, cam member 20 is pivoted downwardly in the brake releasing clockwise direction, and actuator means 30 and lever 30e are pivoted upwardly in the counterclockwise direction. Release lever 54 is then released and returned to the left by return spring 60, whereupon pawl 34 and pawl release cam means 44 are pivoted in the clockwise direction to their initial illustrated positions by the return spring 42. The apparatus is now in the fully released position.

While in accordance with the provisions of the Patent Statutes the preferred form and embodiment of the invention has been illustrated and described, it will be apparent that various changes may be made in the apparatus described without deviating from the disclosed invention.

What is claimed is:

1. Brake cable operating means for axially displacing a vehicle parking brake cable from a brake released position toward a brake engaged position, comprising
   a. a housing 2 adapted for rigid connection with a vehicle body to receive the free end of said brake cable;
   b. a cam member 20 pivotally connected with said housing, said cam member including a cam surface having smoothly merging first 20c and second 20d cam portions;
   c. a connecting member 24 pivotally connected at one end with said cam member, said connecting member being adapted for connection at its other end with said brake cable;
   d. a cam actuator member 30 pivotally connected with said housing for pivoting said cam member from a normal brake-released position toward a brake-engaged position, said actuator member including a first arm portion 30a extending adjacent said cam member, and a cam follower member 30c carried by said first arm portion for engagement with said cam surface, said first and second cam surface portions having such configurations relative to said actuator member that during the initial angular movement of said cam member from the brake-released position toward the brake-engaged position, the cam follower member engages said first cam portion to angularly displace said cam member at a relatively high angular velocity and a relatively low mechanical advantage to effect relatively rapid axial displacement of said connecting member in the brake engaging direction, and during the final angular movement of said cam member toward the brake-engaged position, the cam follower member engages said second cam portion to angularly displace said cam member at a relatively low angular velocity and a relatively high mechanical advantage;

e. foot operated lever means 30e for pivoting said cam actuator member in the brake-engaging direction; and f. pawl and ratchet means 30d, 34 for releasably maintaining said cam actuator member in the brake-engaged position.

2. Apparatus as defined in claim 1, wherein said cam member is bifurcated to define two parallel spaced portions 20a, 20b arranged on opposite sides of said actuator member first arm portion, respectively, each of said bifurcated cam portions carrying corresponding ones of said cam surfaces, respectively.

3. Apparatus as defined in claim 2, wherein said follower member comprises a transverse pin 30c that is carried by said first arm portion and extends at opposite ends for engagement with said cam surfaces, respectively.

4. Apparatus as defined in claim 3, wherein said actuator member includes a second arm portion, and further wherein said pawl and ratchet means includes ratchet means carried by said second arm portion.

5. Apparatus as defined in claim 4, wherein said connecting member comprises a generally U-shaped clevis the parallel leg portions of which straddle the parallel spaced portions of said cam member.

6. Apparatus as defined in claim 5, wherein the pivot shafts between each pair of pivotally connected components are parallel.

* * * * *